US008913016B2

(12) United States Patent
Räty et al.

(10) Patent No.: US 8,913,016 B2
(45) Date of Patent: Dec. 16, 2014

(54) SMALL-SIZED COMPUTING DEVICE WITH A RADIO UNIT AND USER INTERFACE MEANS

(75) Inventors: Matti Räty, Espoo (FI); Eero Punkka, Helsinki (FI)

(73) Assignee: Navigil Oy, Espoo (FI)

( * ) Notice: Subject to any disclaimer, the term of this patent is extended or adjusted under 35 U.S.C. 154(b) by 1192 days.

(21) Appl. No.: 12/812,299

(22) PCT Filed: Jan. 9, 2009

(86) PCT No.: PCT/FI2009/050013
§ 371 (c)(1),
(2), (4) Date: Sep. 27, 2010

(87) PCT Pub. No.: WO2009/087276

PCT Pub. Date: Jul. 16, 2009

(65) Prior Publication Data

US 2011/0057901 A1 Mar. 10, 2011

(30) Foreign Application Priority Data

Jan. 11, 2008 (FI) ..................................... 20085022

(51) Int. Cl.

| | |
|---|---|
| ***G06F 3/041*** | (2006.01) |
| ***G06F 3/045*** | (2006.01) |
| ***G06F 3/042*** | (2006.01) |
| ***G06F 3/043*** | (2006.01) |
| ***H04M 1/00*** | (2006.01) |
| ***G04G 21/08*** | (2010.01) |
| ***H01Q 1/27*** | (2006.01) |
| ***G04G 21/04*** | (2013.01) |

(52) U.S. Cl.
CPC ............... *G04G 21/08* (2013.01); *H01Q 1/273* (2013.01); *G04G 21/04* (2013.01)
USPC ........... 345/173; 345/174; 345/175; 345/177; 455/575.7

(58) Field of Classification Search
CPC ....... G04G 21/04; G04G 17/08; G04G 17/04; G04R 60/06; G06F 1/163
USPC ........ 455/566, 575.5, 575.7, 90.1, 90.3, 66.1, 455/129; 345/173, 174, 175, 177
See application file for complete search history.

(56) References Cited

U.S. PATENT DOCUMENTS

| | | | |
|---|---|---|---|
| 4,511,259 | A | 4/1985 | Horiuchi |
| 5,742,564 | A | 4/1998 | Kuschel et al. |
| 6,577,559 | B1 | 6/2003 | Fleury et al. |
| 6,799,886 | B2 | 10/2004 | Carrad et al. |
| 2001/0014618 | A1 | 8/2001 | Martin et al. |
| 2003/0081506 | A1 | 5/2003 | Karhu |

FOREIGN PATENT DOCUMENTS

| | | |
|---|---|---|
| EP | 0 064 025 | 11/1982 |
| EP | 0 165 548 | 12/1985 |
| EP | 1 282 018 | 2/2003 |
| GB | 2 172 415 | 9/1986 |
| JP | 61-118685 | 6/1986 |
| WO | 96/36960 | 11/1996 |
| WO | 02/44818 | 6/2002 |

OTHER PUBLICATIONS

International Search Report dated May 27, 2009, from corresponding PCT application.

*Primary Examiner* — Dwayne Bost
*Assistant Examiner* — Larry Sternbane
(74) *Attorney, Agent, or Firm* — Young & Thompson

(57) ABSTRACT

A computing device (1) includes a controller (4), a radio unit with an antenna (5), detection element (3) and interface element (2). The interface element output, in response to a user actuation, towards detection element (3) a change in a defined physical characteristic. The detection element (3) include dielectric material and are located within the computing device spatially separated from the interface element (2). The detection element (3) is configured to detect the change output by the interface element and output to the controller (4) a signal that corresponds to the change in the defined physical characteristic. The distance from any part of the antenna to a straight line connecting any part of the interface element with any part of the detection element is at some point less than 6 mm.

25 Claims, 4 Drawing Sheets

SMALL-SIZED COMPUTING DEVICE WITH A RADIO UNIT AND USER INTERFACE MEANS

FIELD OF THE INVENTION

The present invention relates to very small-sized computing devices.

BACKGROUND OF THE INVENTION

The demand for small-sized computing devices is continuously increasing. Computing device in this context refers to an apparatus that comprises computer hardware and software required to perform predefined series of arithmetic or logical operations.

For example, in mobile communications the tendency has continuously been towards smaller terminal units. The need for an appropriate match between the size of human fingers and the size of the input keys has, however, by far dictated the dimensioning of the mobile stations. People have generally considered it more important to be able to input keystrokes conventionally with their fingers, even if it means that the device is then bigger and needs to be carried separately in a pocket, a separate supporter or a purse. Smaller size terminals would in many cases be practical but so far it has not been possible to implement very small devices without compromising the comfortable look and feel of the user interface of conventional terminals.

Other examples of carefully dimensioned computing devices are wearable computers, i.e. computers worn on the body. Wearable computers have been considered especially useful for applications where computational support or monitoring is provided continuously, even when the user's hands, voice, eyes or attention are most of the time actively engaged with other things, like the physical environment. In case of wearable devices the dimension is naturally of utmost importance. The wearable device must be easily reached for input and output operations, but it must not interfere with the actions performed by the user. If, for example, the wearable device is strapped to the wrist, it must not protrude too far from the wrist to complicate dressing or arm movements of the user.

In some computing devices the dimensioning problem has been solved by combining input and output operations to touch screens. However, in many cases users experience that the finger is too clumsy to operate the screen and they do not wish to carry a stylus for operating the touch screen of the otherwise fully wearable device. For some users and in some environments very precise hand motions are not even possible. Many times the operating finger also blocks visibility to the information displayed in the screen, which makes comfortable interaction with menu selections practically impossible. For example, in a computing device that is strapped to the wrist the screen is typically a circle of 3-4 cm diameter. Using this size of screen simultaneously for both input and output operations is in most of the wearable computer applications not viable.

In some other small-sized computing devices the dimensioning problem has been solved by replacing the keys with a input wheel. The computing device receives commands by interpreting movements of the finger on the wheel and runs through a predefined group of menu options according to these movements. A choice of an option is confirmed by pressing a tactile button within the wheel. The wheel is separate from the screen such that the visibility of the screen remains good at all times. Also the use of circular movements has been considered very intuitive and pleasant in operation. However, the separation results in that the size of the computing device is the combined size of the screen and the wheel. For a very small device, like a wrist computer, this is already too much.

In traditional wrist computers the display screen is mounted in a frame that may comprise a number of tactile keys. The input operations are then given by means of a single keystroke or a combination of keystrokes. However, these buttons are typically relatively small and for many users, like elderly people or infants, the size and tactile feeling of such buttons does not provide appropriate response and their use is considered too complicated. Also in many conditions, like in outdoor environment, production lines, or rescue operations the protective clothing used in hands prevents efficient operations of small-sized buttons. Furthermore, the placing of such buttons becomes especially difficult when shielding distances to an integrated antenna need to be considered.

Accordingly, dimensioning of the input/output operations to a compact computing device is challenging as such. However, when the computing device also needs to provide a wireless communication interface to an external node, the design gets even more complicated. Wireless access requires use of antenna that needs to operate in an acceptable level. Typically operations of the antenna are protected by not placing any strongly dielectric materials close to the antenna. In design, the shielding distance corresponds to a distance where a dielectric object brought into the vicinity of the antenna begins to disturb normal operations of the radio unit. Any dielectric materials, including circuitry for detecting user inputs, need to be appropriately distanced from the antenna. Therefore computing devices with an easy-to-use user interface and a radio unit very often end up in relatively massive configurations.

SUMMARY OF THE INVENTION

An object of the present invention is thus to provide an improved small-sized computing device with a radio unit such that the user interface and the antenna may be positioned closer to each other than in conventional devices. The objects of the invention are achieved by a computing device that is characterized by what is stated in the independent claims. The preferred embodiments of the invention are disclosed in the dependent claims.

The object is accomplished by dividing the user input operations to spatially separated interface means and detection means and arrange them in a specific configuration in a very near vicinity of the antenna. The interface means may be made available for user interaction and the detection means, which typically comprise dielectric materials, may be safely located beyond the shielding region of the antenna.

This configuration allows the user interface and the antenna to optimally utilize a three-dimensional space and thus occupy a very small region of the computing device. This enables decreasing overall dimensions of the computing device to meet the strict design demands of small-sized computers, and wearable computer devices.

BRIEF DESCRIPTION OF THE DRAWINGS

In the following the invention will be described in greater detail by means of preferred embodiments with reference to the attached drawings, in which.

DETAILED DESCRIPTION OF THE EMBODIMENTS

Figure 1:
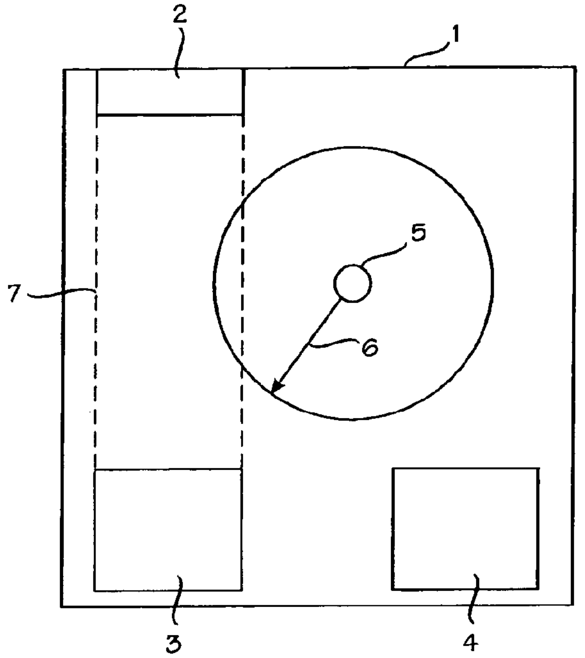
FIG. 1 illustrates a side view of an embodied computing device.

The following embodiments are exemplary implementations of the present invention. Although the specification may refer to "an", "one", or "some" embodiment(s), reference is not necessarily made to and/or a described feature does not apply to only one particular embodiment only. Single features of different embodiments of this specification may be combined to provide further embodiments that are thus considered to belong to the scope of protection.

The invention may be applied to any computing device the functions of which are controllable by means of input and output operations. Hereinafter the computing device will be referred to by the term 'device'. In the following the basic elements of the device will be illustrated with the block chart of FIG. 1. The computing device 1 is a user terminal that comprises a user interface and a radio. In conventional computers the user interface and the antenna of the radio unit are placed far away from each other. This is because the dielectric materials required in the user interface elements interfere with the operation of the antenna. In very small-sized computers, where dimensions of the device are of utmost importance, it would be very useful to co-locate the antenna and the user-interface in approximately same regions.

The significant challenge is, however, to overcome the interference between the interaction with dielectric materials, like the electrically conductive elements of the device and the ground plane generated by the contact with the user's body. The term dielectric refers herein to materials, the relative permittivity of which is more than 2. Typically any radio unit has some kind of antenna interference threshold value that corresponds to a defined maximum acceptable degradation of the antenna radiation efficiency from the electromagnetic interaction between the antenna and a dielectric element. When designing the device, the distance between the dielectric elements, also called as shielding distance, is selected such that the antenna interference threshold value is substantially not exceeded during operations of the radio unit.

The level of acceptable interference naturally varies from application to application. For example, for cellular communication networks, regulators specify limits for the radiofrequency output power of the device. When the limit is known and the antenna setup fixed, the designer may determine how close he can bring other elements, especially elements that comprise dielectric materials, without substantially disturbing the operation of the radio unit. Also the energy consumption needs to be taken into account because a poorly performing antenna consumes the device battery much faster. This distance corresponds to the shielding distance of the antenna. Correspondingly, in global positioning systems, having a defined antenna setup, the designer may determine a distance closer to which one cannot mount any dielectric component without degrading the required sensitivity of the antenna For example, in GSM standard, the maximum output power transmission for Class 4 devices is 2.0 W. In single-frequency consumer GPS receivers, on the other hand, the acceptable sensitivity levels need to be in the area of −140 dBm for proper signal acquisition.

The actual shielding dimensions associated to the antenna depend on the selected operational frequencies selected for the device. Using the antenna components of today, the shielding distances applied in most commercial and private communication networks, paging networks and positioning networks lead to shielding distances of more than 6 mm. However, it is clear that in a very-small sized computer, over 6 mm distance between dielectric elements of the user interface and the antenna is far too much from the design point of view. According to the other design requirements, the antenna and the user interface should desirably fit into same space such that the smallest distance from the user interface to the antenna could be less than 6 mm. As a matter of fact, especially for wearable devices, it has been noted that dimensions with distances less than 4 mm would be highly useful.

In the present embodiment, this is accomplished by dividing the signal generation to spatially separated interface means and detection means. The interface means are available for user interaction and the detection means that typically comprise dielectric materials are safely located outside the shielding region of the antenna. However, the path from the interface means to the detection means passes through a region in the shielding distance from the antenna.

The interface means receive user actuation and generate a change in a defined physical characteristic in response to that user actuation. This physical characteristic is transferred as a signal along a straight path that connects any part of the interface means with any part of the detection means. The path may be considered as formed by connecting any part of the interface means with any part of the detection means. In order to fulfill the design requirements of the small-sized computer, the path is configured such that the distance from any part of the antenna to a straight line connecting any part of the interface means with any part of the detection means is at some point less than 6 mm. The physical characteristic of the signal is selected such that its passing through a region in the shielding distance from the antenna does not substantially interfere with the operation of the antenna. This specific configuration allows the user interface and the antenna to be located into a very small region of the computing device, which enables decreasing overall dimensions of the computing device.

Accordingly, the computing device 1 comprises interface means 2 that are configured to output a change in a defined physical characteristic in response to a user actuation. Correspondingly the device comprises detection means 3 that are at least partly made of dielectric material. The detection means 3 are located within the computing device 1, but are spatially separated from the interface means 2. The object of the detection means 3 is to detect the change in the defined physical characteristic that the interfaced means 2 output and in its part output to a computing element, a controller 4 a signal that corresponds to the detected change in the defined physical characteristic.

The antenna 5 has a shielding distance 6 for dielectric materials. As shown in FIG. 1, during operation the interface means 2 may transfer the change in the defined physical characteristic towards the detection means 3 such that the transfer path 7 from the interface means 2 to the detection means 3 passes through a region in the shielding distance 6 from the antenna 5. This means that the distance from any part of the antenna to a straight line connecting any part of the interface means with any part of the detection means may at some point be less than 6 mm. However, the dielectric components, like the detection means, remain beyond the shielding distance at all times. For a person skilled in the art it is clear that the scope of protection covers various implementations, both for the interface means and the detection means. In the following one exemplary embodiment applying optical detection is discussed in more detail. Other embodiments will be briefly discussed later in the document.

Figure 2:
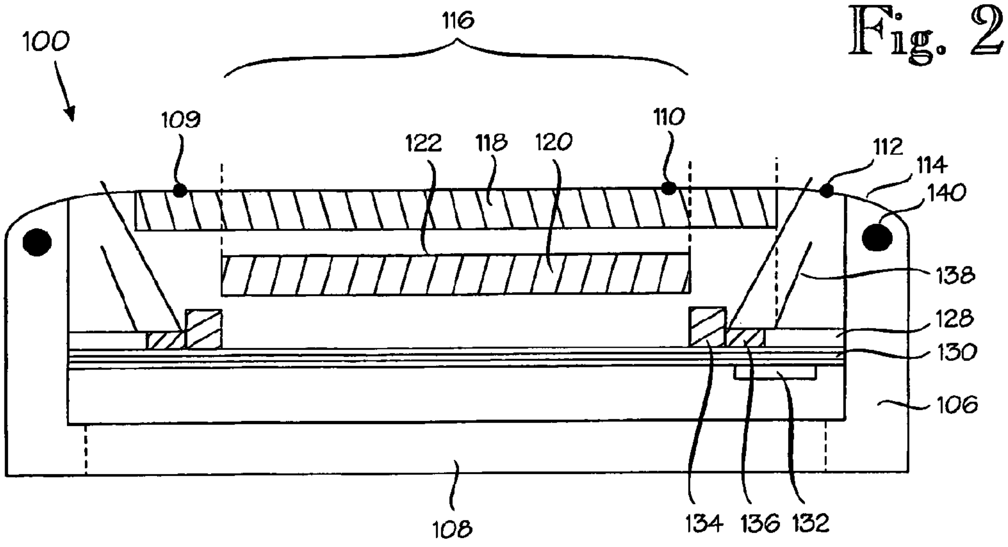
FIG. 2 illustrates a side view of an embodiment applying optical detection.

As an example of such device is a wearable device, more specifically a wrist computer that may be strapped to the arm of a user is discussed in more detail. It should be noted that only elements necessary for describing the invention are discussed herein. For a person skilled in the art it is clear that full implementation of a wrist computer requires a number of conventional elements and parts not specifically disclosed herein. FIG. 2 illustrates an embodied wearable device as a user terminal 100 that comprises fastening means 102 for attaching the device to the body of the user.

The user terminal 100 comprises a housing 106, at least part of the external side of the housing forming a base 108 for contacting the user's body during input and output operations of the user terminal. In the exemplary case of wrist computer the base 108 is formed by a substantially flat surface of the frame that is in contact with the arm of the user while the user terminal is strapped on.

One side whose visibility is not blocked by the user's body forms an external surface 109 of the user terminal 100. The form of the external surface 109 may comprise planar or curved sections, depending on the outward appearance of the device. In order to provide a slim look and feel, the form of the wrist computer typically comprises a higher planar region in the centre part of the external surface and slanted side sections, as shown in FIG. 2. In the user terminal of FIG. 2 the external surface 109 of the user terminal 100 is the side that extends substantially parallelly with the base and forms a convex surface with planar and the slanted parts. The planar part provides a display area 110 through which the user may receive output information represented in visual form. The curvilinear part comprises an input area 112 through which the user may input information to the user terminal, and a frame area 114 formed by part of the surface of the frame 106. Typically the areas of the display part and the input part do not overlap, i.e. they are separate from each other.

In the user terminal of FIG. 2 the display area 110 acts as an external surface of a display element 116 that comprises a glass 118 and a liquid crystal display 120 separated by some optically transparent medium 122, for example air. When strapped to the wrist, the optically transparent media 118, 122 enable the user to view the pixel representation of information in the liquid crystal display 120.

The input area 112 in the user terminal of FIG. 2 acts as an external surface to an interface, here an input element 124 that comprises an optical element 126 and an optical sensor 128. The optical element 126 is a medium that receives light impacted on the input area 112 and delivers the light to the optical sensor 128 in another side of the optical element. Light in this context refers to electromagnetic waves in visible, infrared, and ultraviolet frequencies. Preferably the optical sensor 128 is located in that other side of the optical element 126, i.e. in the end of the optical element 126 that is opposite to the input area. The optical element may be homogenous such that the light rays are not essentially converged or diverged in their path through the optical element. Advantageously the optical element is provided with light diverting means such that a light impacted on the input area is focused to the center area of the optical sensor 128. A sensor refers generally to an element that receives a signal or stimulus and responds to it in a distinctive manner. The optical sensor of FIG. 2 thus refers to an element that receives light and responds to it by producing a resulting electric signal to a controller 132 of the device.

The controller 132 may be implemented, for example, as a digital signal processor, in which all modifications and configurations required for implementing functionality of the embodiment may be performed as routines, which may be implemented as hardware, added or updated software routines, application circuits (ASIC) and/or programmable circuits.

The optical sensor 128 is connected to circuitry 130 that receives the electric signal produced by the optical sensor and delivers it to a controller 132. In FIG. 2 the circuitry 130 and the controller 132 are shown to be comprised in a printed circuit board to which also the optical sensor and other processor chips are connected. During operation of the device some light typically falls on the input area of the device. The optical element delivers the received light to the optical sensor that produces electric signals that are delivered to the controller. The controller detects the electric signals received from the optical sensor and interprets these to a predefined group of semantic meanings. Especially during input operations the controller is able to interpret whether a finger obstructs the reception of light on the input area or not. Accordingly, in order to implement an input operation the user only needs to move a finger to an appropriate place on the input area, no pushing or other forcing movement is required for the action. The change in intensity of light output from the input element 124 is thus transferred to the optical sensor 128 and transformed into a signal to the controller 132.

The detection of variations in the electric signals by the optical sensor may be continuous or may be initiated and terminated by means of predefined input functions. For optimizing the power consumption of the user terminal it is advantageous to activate the optical sensor or the interpretation of signals from the optical sensor only for the periods during which the user is engaged to the input operation. Triggering of the input operation may be implemented in several ways without deviating from the scope of protection. FIG. 2 illustrates an advantageous embodiment where the optical sensor is complemented with a capacitive sensor 134 for sensing the initiation of an input procedure. A capacitive sensor 134 measures changes in capacitance in one or more predefined locations of the device, for example in a particular initiation area on the input area 112 or the frame area 114. The capacitive sensor converts the detected changes in capacitance into electric signals that are delivered to the controller 132. The controller is configured to interpret the signals received from the capacitive sensor such that a situation where a human finger is placed on the predefined initiation area is detected.

The advantage of using a capacitive sensor for detecting the initiation of input operation is that the operation of the capacitive sensor is not dependent on light. The input operation may thus be initiated notwithstanding the amount of light in the operating environment of the user terminal. On the other hand, the size of capacitive sensors is typically bigger than the size of optical sensors. Therefore replacing the optical sensors fully with conventional arrangement of capacitive elements in the input element is not considered feasible. The combination of initiating an input procedure with a capacitive sensor and implementing the input procedure with one or more optical sensors provides an optimal solution from the point of view of the dimensioning the user terminal.

Basically one capacitive or optical sensor is able to detect one input action, for example, 'finger is on the sensor', and this may be adequate for some applications. The input area associated to one sensor may be adjusted to match the size of an average finger such that inputting information through that particular input area is convenient. The optical element allows tight connection with the glass of the display area and the frame such that the combined configuration may be made very robust and watertight.

In dark conditions the light falling on the input area may not be intensive enough to enable detection by the optical sensor 128. For these situations the user terminal is equipped with a light element 136, for example a small light emitting diode (LED) mounted on the printed circuit board. For example, when the controller during operation detects that the capacitive sensor output indicates that a finger is on the input area, but none of the optical sensors associated with the input area detects the finger, it switches the LED on. The light emitted by the LED traverses the optical element 126 and part of it reflects back from the finger such that the optical sensor 128 may detect it. In order to avoid dispersion of the emitted light to the optical sensor before meeting the finger, the optical element is adjusted to refract or reflect light from the LED such that the intensity of the light received to the input area is optimized. Such adjusting may be implemented by an optical separation element 138, for example a reflective layer within the otherwise transparent optical element. In an aspect of the embodiment the light element 136 used for emitting light from the interior to the input area of the device is the same light source that is used for illuminating the liquid crystal display of the device.

When the user terminal is also designed to provide wireless connectivity, it also comprises a radio unit. Radio refers to the transmission of signals, by modulation of electromagnetic waves with frequencies below those of visible, infrared, and ultraviolet light. A radio unit thus refers here to a transmitting or receiving apparatus that comprises a specialized transducer to convert radio-frequency (RF) fields into electrical signals or vice-versa. A receiving part of the radio unit intercepts RF energy and delivers the generated signal to the controller of the device. A transmitting part of the radio unit is fed with electrical signals from the controller of the device and it generates a corresponding RF field. In its basic form the radio unit may be formed by an antenna 140 that is coupled with the controller. In practice, the radio unit comprises at least one antenna and some controlling circuitry (not shown) for controlling the transmission and reception operations. In user terminals for cellular networks, the radio unit typically comprises an integrated unit for elements required for communicating with the cellular network via the applied radio access network. This integrated unit is connected to and its operations are controlled by the controller 132 of the user terminal.

In the present embodiment, from the performance point of, the optimal location for the antenna 140 is, in general, close to the external surface of the device such that it is located far away, at least in a shielding distance 142 from the other electrically conductive parts, like the display and the printed circuit board, and from the ground plane generated by the arm below the base 108. In configurations with a central display, a good antenna configuration can be achieved with a loop antenna extending to a defined length around the display area 110 of the device. The length of the antenna again depends conventionally on the selected operational frequencies selected for the user terminal.

In the embodied user terminal 100 according to the invention, the required distance from the antenna 140 of the radio unit to any straight line connecting the display 120 and the printed circuit 130 including the sensors 128, 134 is achieved by the spatial extent of the optical element 126. The antenna 140 is located immediately below the external surface 109, for example in a thin planar region below the frame area, so that the distance from the antenna 140 to the sensor element 128 is many times the distance from the external surface 109 to the antenna 140. As discussed above, in the wrist computer type of devices that operate in typical cellular radio system frequencies the distance between the antenna and any of the electrically conductive elements needs advantageously to be of the order of 4-6 mm. The distance from the external surface 109 to the antenna 140 is typically less than 1 mm so the ratio between the distances is at least four.

For detection of the light delivered from the input element 124, FIG. 2 shows a printed circuit board having a planar form, but the form of the printed circuit board may be changed without deviating from the scope of protection. The printed circuit board may have, for example, a bent form such that the two parts of the board form an angle of about 135 degrees. Such configuration may be applied to achieve the required 6 mm distance to a substantially circular loop antenna by all the elements around the printed circuit board.

The location of the antenna or antennas of the device in the external surface 109 may be selected according to the configuration, as long as the spatial separation to the other parts may be provided by means of the optical element. In FIG. 2 the loop antenna circles the input area immediately under the surface in the frame area. However, the antenna may also be located differently. For example, it has been noted that with patterns of very small holes (diameters of the order of micrometers), it is possible to achieve a transparency of metallic foils. In an aspect of the invention, the antenna of the device is made of such transparent foil of metal and arranged on the optical element. Such an arrangement provides a way to achieve a very compact design for the element. In addition, even if transparent to incoming light, the metallic foil may block the visibility of the underlying parts. This effect could be used at the same time to enhance the visual appearance of the device.

Each device tolerates some amount of interference. The device has an antenna interference threshold value that varies according to the configuration of the device and corresponds to the maximum acceptable interference from the electromagnetic interaction between the antenna 140 and the other elements within the device. The dimension of the optical element in the direction between the part of the input area and the optically sensing surface may, for example with careful design and testing operations be adjusted such that the antenna interference threshold value is substantially not exceeded during normal operation of the device. In the embodied configuration means that the distance between the antenna and the optically sensing surface and the associated circuitry is at least 4-6 mm.

Figure 3:
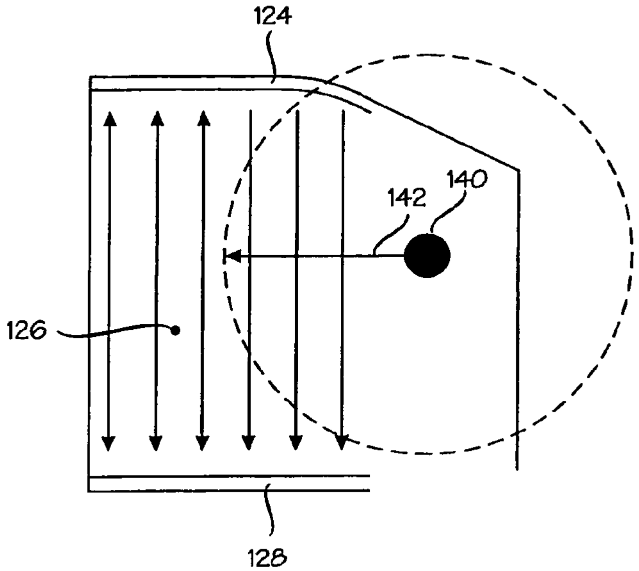
FIG. 3 shows exemplary configuration for the transfer path and the shielding distance.

As may be referred from the magnified exemplary configuration shown in FIG. 3, the antenna 140 is in the immediate vicinity of the optical element 126. However, according to the invention, the physical feature or characteristic generated or changed as a result of a user actuation is such that the transfer path from the interface means to the detection means is well known and may pass through a region in the shielding distance of the antenna without substantially interfering with its operation. Accordingly, the light rays from the input element 124 to the optical sensor element 128 may freely pass the region in the shielding distance 142 of the antenna 140 because they do not substantially interfere with its operation. When a user brings his finger to a proximity region of the input element, the influx of the light rays is obstructed and the intensity of the light falling on the optical sensor element 128 decreases.

Due to the separated configuration of the element 124 for generating the physical response, and the dielectric element 128 for generating the associated signal, the user interface of the device and the antenna may locate very close to each other without, however, disturbing the operation of the radio unit. This is an extremely useful architecture that may be applied to decrease the size of any computing device that is equipped with a radio unit.

Figure 4:
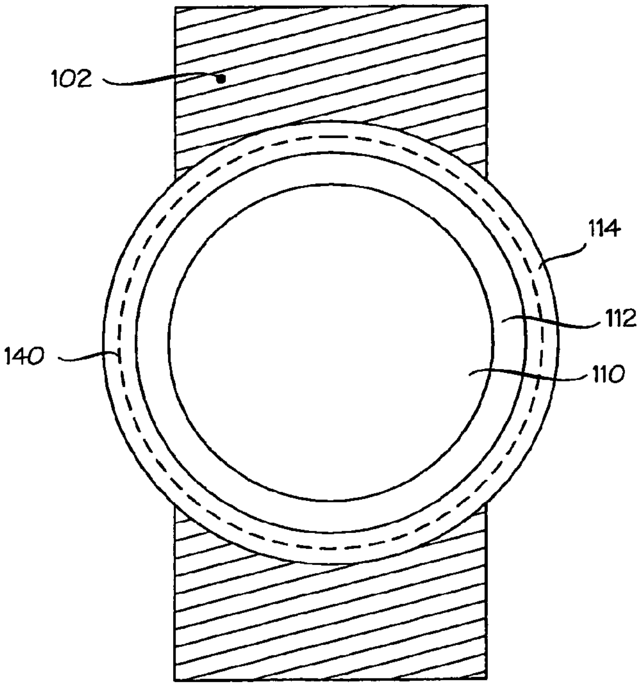
FIG. 4 illustrates a face view of the computing device in FIG. 1.

FIG. 4 shows a face view of the device in FIG. 2. The display area 110 and the input area 112 are separate from each other such that a finger used for inputting information does not block view to the displayed information. In the embodied device the input area at least partly surrounds the display area, which means that the total input area for inputting information has an elongated form. This allows use of a plurality of optical sensors whose signals may be combined in the controller such that practically any type of information may be input as a predefined sequence of finger movements.

Figure 5:
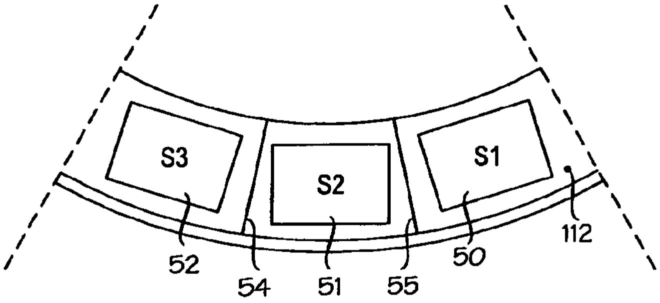
FIG. 5 illustrates an exemplary configuration for the input area of the computing device.

FIG. 5 illustrates an exemplary configuration for taking the advantage of the elongated form of the total input area of the user terminal of FIG. 2. FIG. 5 illustrates part of the input area 112 that comprises a group of optical sensors S1 50, S2 51, S3 52 each of which receiving information from a corresponding subarea of the total input area 112. In the embodied example subsequent sensors of same form are arranged to a ring that surrounds the display area. When a finger is on one of the sensors, it detects the finger and forwards a signal to the processor. The accuracy of sensing may be improved by optical separation elements 54, 55 arranged between adjacent optical elements. The optical separation elements may be implemented by, for example, a reflective layer between the elements. The resulting structure formed of successive optical elements and integrated layers may be manufactured as a single mounting element. This enables a durable and watertight assembly, which is important especially for wearable devices. Moving of the finger through several successive sensors S1-S2-S3 generates signals from each of these sensors. The controller stores a ruleset of interpretations and corresponding commands for sequences of sensor inputs. By moving the finger according to a rule of the ruleset the user may input a command to be performed by the controller. For example sliding the finger through sensors S1-S2-S3 could be interpreted to mean as a command to scroll a cursor on the screen downwards and through sensors S3-S2-S1 as a command to scroll a cursor on the screen upwards.

The commands may be generic such that they are always the same, notwithstanding the contents of the display. For example, holding a finger over a specific sensor for a predefined time (3 seconds in a 12 o'clock position) could at any times be interpreted to mean an emergency and initiate a call to emergency exchange. The commands may also be input and interpreted in connection with the content of the display. For example, the user could scroll the cursor through a menu of alphabets by sliding the finger through sensors S1-S2-S3 and select a letter 'M' by tapping sensor 'S2' twice.

Interaction with the user may be enhanced also by other conventional output means, like an audio element for providing sounds, a vibration element for vibrating the device, or an additional light element for providing light effects according to detected operations of the user. For example, the controller could be configured to activate one of such elements to provide a sound, light or vibration to acknowledge a detected user input (not shown in FIG. 2).

A critical aspect in the design of any small-sized devices is power consumption of the device. In a further embodiment of the invention, the power consumption of the device is improved by using photovoltaic panels as part of the optical sensors. A photovoltaic panel is an element that produces a voltage when exposed to radiant energy, especially light. In the configuration shown in FIGS. 2 to 5, the light falling on the input area is delivered by the optical element to the photovoltaic panel 128. The resultant voltaic from each of the applied photovoltaic panels is measured individually and on the basis of the level of the measured voltage it is possible to determine whether a finger is on the respective sub-area of the input area or not. However, in addition to the optical sensing, the voltage provided by the photovoltaic panels may be used to load the battery and/or the capacitor of the device. The use of photovoltaic panels for optical sensing significantly improves the power economy of the device. It is to be noted that in implementations where solar panels are used for optical sensing may be applied in a variety of computing devices, notwithstanding whether the device comprises a radio unit or not.

Figure 6:
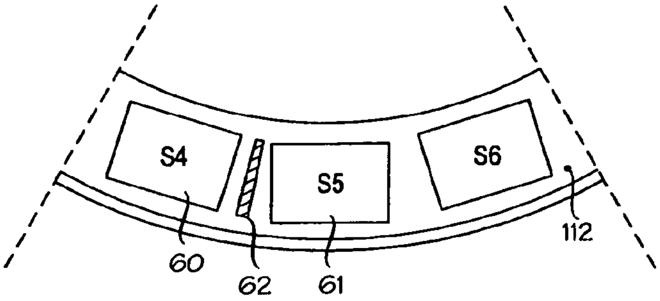
FIG. 6 illustrates a further embodiment for the input area of the computing device.

The use of optical sensing enables provision of a further application employing optics. FIG. 6 illustrates a further embodiment of the device where the input area of the device is further utilized for optical scanning of bar codes. In some applications, for example in monitoring services of elderly people, users may need help to perform some important daily routines. For example, dispensing medicines is important and mistakes happen very easily. A bar code attached to a dose of medicine would enable a monitored patient to read the code with the scanner, check from a calendar note in the user terminal or in a server accessed with the user terminal that the dose is the one that he or she is supposed to take, and thus ensure that a right dose is taken at a right time.

In a further embodiment of the invention, the optical separation provided by at least one of the optical separation elements 60, 61 is arranged as a slot including a bar code reading element 62. The bar code reading element is safely located within the robust configuration formed by the optical element of the user terminal and through the optical element the bar code reading element 62 is capable of scanning the high and low reflectance areas of the bar code. The width of the division in a wrist computer is typically of the size that optimally matches with the narrow dimension of the scanning area of the bar code reading element. On the other hand, the optical element on the adjacent optical sensors may be designed to focus light from their respective input area parts away from the bar code reading element and towards the optical sensing areas of the sensor. This provides a wedge-like space within the optical element. The space matches optimally to the combined assembly of the optical sensing and bar code reading.

Figure 7:
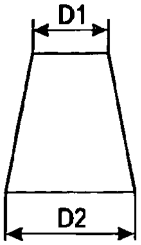
FIG. 7 shows a side view of the space assignable to the bar code reading apparatus.

This is illustrated in FIG. 7 that shows a side view of the space assignable to the bar code reading apparatus. In the external surface area side the required width of the space is D1 while in the printed circuit board side the required width of the space is D2. D1 is typically configured to be narrower than the narrowest bar used in bar codes. D2 is larger than D1, typically adjusted according to the chip carrying the unit of the bar code reading element.

In the present embodiment the ability to transfer the detected physical characteristic via a transfer path that passes through a region in the shielding distance of the antenna is implemented by optical means, i.e. applying light. Light represents one physical characteristic that requires use of at least one dielectric detection component but as a signal carrier does not substantially interfere with the electromagnetic waves of the antenna. Other non-interfering physical characteristics to deliver a physical response to a dielectric detector, like volume of a piezoelectric material, various types of radiation, sounds, movements of solid object, pressure, or the like may be applied without deviating from the scope of protection.

For example, the interface means may comprise an actuation surface and a rod, filament or film made of piezoelectric material that extends between the actuation surface and a detection sensor within the device. The detection can be a voltage sensor connected to the rod and adjusted to detect the voltage generated by the piezoelectric material inside the rod. When the user causes an actuation to the surface, for example by pressing it the piezoelectric rod generates a voltage that corresponds to the actuation. Alternatively, the actuation end of the piezoelectric material may be vibrated electrically and the generated surface acoustic wave then detected electrically in the other end of the piezoelectric rod, film, or filament The voltages in the piezoelectric material do not substantially interfere with the electromagnetic waves of the antenna and so that the minimum distance from the rod to the antenna may be less than 6 mm. The transfer path via the rod thus pass through a region in the shielding distance of the antenna, but the operation of the radio unit is not substantially disturbed, because the voltage detection circuitry of the detection means are beyond the shielding distance of the antenna.

In another example the compression surface may be operatively connected to a container that extends between the compression surface and the detection means and radiates alpha radiation in relation to the pressure in the container. When the user causes pressure to the compression surface, the pressure in the container increases and causes the intensity of alpha radiation to change. The detection means comprise a radiation sensor that is adjusted to detect changes in the intensity of the alpha radiation from the container. The alpha radiation does not substantially interfere with the electromagnetic waves of the antenna so the transfer path via the rod may pass through a region in the shielding distance of the antenna without disrupting the operation of the radio unit, as long as the material of the container is substantially non-dielectric. The minimum distance from the rod to the antenna thus remains less than 6 mm.

In another example, the interface means comprise a sonic transmitter and a user accessible switch for generating a change to a transmission of the sonic transmitter. The switch may be made accessible to the user by means of, for example, a manually operable button. Correspondingly, the detection means comprise a sonic receiver that is adjusted to detect transmissions or changes in the transmissions of the sonic transmitter. The sonic effect, for example an ultrasound effect, delivers the response to the user action from the surface of the device to the detection means in the interior of the device without substantially interfering with the operation of the antenna. It is noted that a reflector within the device may be used to reflect the sonic wave such that both the sonic transmitter and the sonic receiver can locate in the surface.

In another example, the interface means comprise an actuator that is made accessible to a user, and a solid rod that extends between the actuator and the detection means. The detection means comprise a sensor that is configured to detect a movement of the rod, for example movement of the end of the rod. When the user operates the actuator, for example via a connected button, the rod moves and causes generation of a signal to the controller. The material of the rod is selected such that it may pass through a region in the shielding distance of the antenna without disrupting the operation of the radio unit. The minimum distance from the rod to the antenna remains less than 6 mm.

In another example, the interface means comprise again a compression surface and a container that comprises pressure transferring material. The detection means comprise a pressure sensor that is connected to the volume and configured to detect pressures within it. The container extends between the compression surface and the detection means. When the compression surface is pressed, the pressure is changed and the pressure sensor generates a corresponding signal. As long as the pressure transferring material is not dielectric, the transfer path formed by the container may pass through a region in the shielding distance of the antenna without disrupting the operation of the radio unit. The minimum distance from the rod to the antenna thus remains less than 6 mm.

Figure 8A:
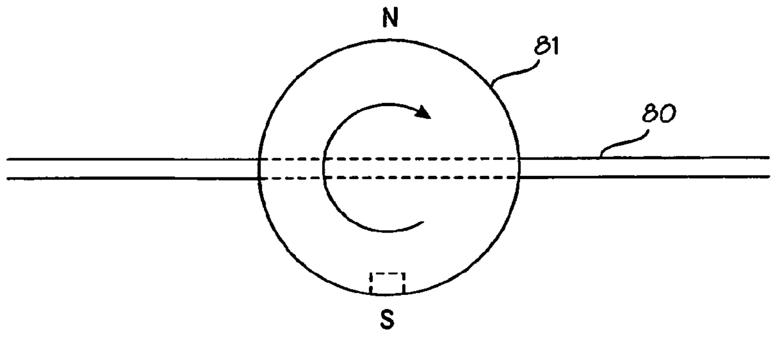
FIG. 8A illustrates a top view of a combination of interface means and an antenna.
Figure 8B:
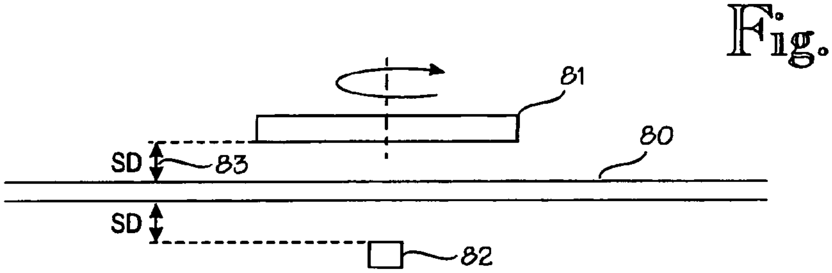
FIG. 8B illustrates a corresponding side view of a combination of the interface means, the antenna, and the detection means.

FIGS. 8A and 8B illustrate another example, where user actuation is transferred to a detector in form of a magnetic field. FIG. 8A illustrates a top view of a combination of interface means and an antenna 80. The interface means comprise magnetic element, for example, a rotating magnetic wheel 81 that is operable by the user, directly or via separate actuators, like buttons, or the like. The wheel allows the user to input information by defined rotational movements. When the wheel 81 is rotated the magnetic field changes accordingly. It is noted that rotational movement is used here as an example only. Alternative means for changing the magnetic field may be applied without deviating from the scope of protection. For example, translational means that increase and decrease the distance between the magnetic element and the detection means may be applied.

FIG. 8B illustrates a corresponding side view of a combination of the interface means, the antenna, and the detection means. The detection means comprise a Hall sensor 82 configured to detect changes the magnetic field generated by the rotating wheel 81 and output a signal that corresponds to the change in the polarity of the magnetic field to the controller. The static magnetic field of the rotating wheel does not disturb the antenna conductor 81 so the antenna 80, the rotating wheel 81, and the Hall sensor 82 may be placed substantially on top of each other, as long as the shielding distance SD 83 is maintained the different layers. This means that the minimum distance from the straight line connecting the interface means and the detection means to the antenna closes to zero. This provides an important possibility to reduce the overall size of the computer device.

Figure 9A:
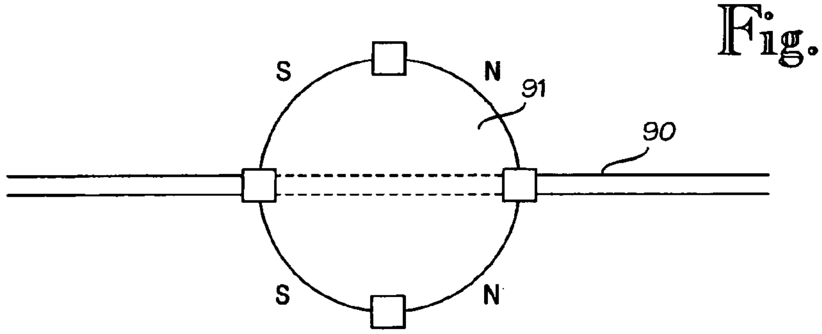
FIGS. 9A and 9B illustrate a further example where the principle of FIGS. 8A and 8B is applied to an array of detectors.
Figure 9B:
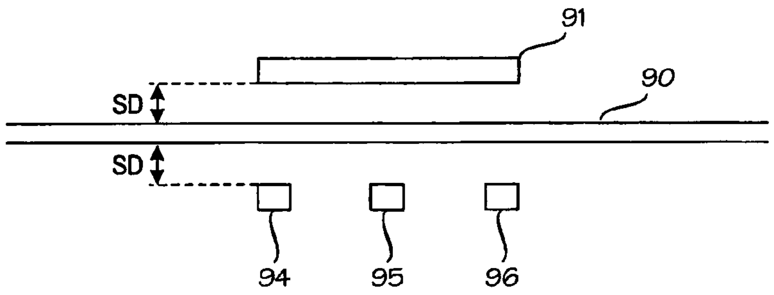

FIGS. 9A and 9B illustrate a further example where the principle of detection of magnetic fields of FIGS. 8A and 8B is applied to an array of detectors. The antenna 90, the rotating wheel 91 and an array 94, 95, 96 of Hall sensors are again placed substantially on top of each other, the shielding distance SD 93, however, maintained the different layers. The changes in S/N polarity of the rotating wheel are detected by the plurality of Hall sensors 94, 95, 96. The resulting signal is computed from the combination of the signals of the Hall sensors 94, 95, 96. As earlier, the use of combination of sensors in different locations enables detecting more movements of the user and thus increases the amount of information that may be transferred via the user interface of the device.

In another example, the antenna is located such that the proximity region and the shielding region coincide at least partly. When the user brings an object, like his finger, into the proximity region, the resonant frequency of the antenna typically changes. The detection means comprise a sensor that is adjusted to measure the antenna resonant frequency and output a signal that corresponds to the antenna resonant frequency or to the change in the antenna resonant frequency to the controller.

It will be obvious to a person skilled in the art that, as the technology advances, the inventive concept can be implemented in various ways. The invention and its embodiments are not limited to the examples described above but may vary within the scope of the claims.

The invention claimed is:

1. A computing device comprising:

a controller;

a radio unit with an antenna;

interface means that are configured to output, in response to a user actuation, a change in a defined physical characteristic; and detection means that comprise dielectric material located within the computing device and spatially separated from the interface means, and are configured to detect the change output by the interface means and output to the controller a signal that corresponds to the change in the defined physical characteristic, wherein the change in a defined physical characteristic is configured to travel from the interface means to the detection means along a path formed by connecting any part of the interface means with any part of the detection means, the distance from a straight line within the path to the antenna to being at some point less than 6 mm.

2. The computing device according to claim 1, wherein, the computing device comprises a surface area including a digital display area and an input area, the display area and the input area being spatially separate from each other, and the interface means comprise an actuation area in the input area.

3. The computing device according to claim 2, wherein, the interface means comprise a proximity region that extends outwards from an actuation area in the input area, and the interface means are configured to generate a change in a defined physical characteristic in response to an object entering the proximity region.

4. The computing device according to claim 3, wherein, the detection means comprise an optical sensor that is located within the computing device and has an optical sensing area towards the actuation area, the interface means are configured to output a change in light falling on the actuation area in response to an object entering the proximity region, and the transfer path comprises an optical element that extends between the actuation area and the optical sensing area of the optical sensor at least partly via the shielding distance of the antenna and is configured to transfer the light falling on the actuation area to the optical sensing area of the optical sensor.

5. The computing device according to claim 4, wherein the optical sensor is a photovoltaic panel.

6. The computing device according to claim 4, further comprising:

a capacitive sensor for detecting a finger in a predefined initiation point of the surface area of the computing device.

7. The computing device according to claim 6, wherein the detection means further comprise a plurality of detectors each associated with a part of the input area.

8. The computing device according to claim 4, wherein, detection means comprise a plurality of detectors each associated with a part of the input area, and the optical element comprises a respective plurality of integrated optical sub-elements, and at least one optical separation element separating two adjacent optical sub-elements.

9. The computing device according to claim 8, further comprising:

a bar code reading element, integrated with the plurality of integrated optical sub-elements such that the scanning slot of the bar code reading element is located in the input area between two adjacent optical sub-elements.

10. The computing device according to claim 9, wherein, the computing device comprises a circuit board, the optical sub-elements on the adjacent optical sensors comprise diverting means for focusing light from their respective input area parts away from the bar code reading element and towards the optical sensing areas of the optical sensors, and the width of the slot for the bar code reading element in the printed circuit board is larger than the width of a slot for the bar code reading element in the surface area resulting in a wedge-like space of the optical element being allocated for the bar code reading element.

11. The computing device according to claim 3, wherein, the interface means are configured to output a change in capacitance in response to an object entering the proximity region, and the detection means comprise a capacitive sensor configured to detect the output change in capacitance and output a signal that corresponds to the change in capacitance to the controller.

12. The computing device according to claim 3, wherein, the antenna is located such that the proximity region of the interface means and the shielding region of the antenna coincide at least partly, the interface means are configured to output a change in a resonant frequency of the antenna in response to an object entering the proximity region, and the detection means are configured to detect the output change in antenna resonant frequency and output a signal that corresponds to the antenna resonant frequency to the controller.

13. The computing device according to claim 2, further comprising:

a light element configured to emit light falling on the input area from the inside of the computing device.

14. The computing device according to claim 13, wherein the optical element comprises an optical separation element configured to prevent light emitted by the light element from falling directly on the optical sensor.

15. The computing device according to claim 13, wherein the light element is a light source used for illuminating also a liquid crystal display of the device.

16. The computing device according to claim 2, wherein the shape of the input area is a curvilinear or rectilinear ring extending around the display area in the surface area of the computing device.

17. The computing device according to claim 16, wherein, the form of the display area in the surface area of the computing device is substantially circular, and the form of the input area in the surface area of the computing device is a substantially circular ring surrounding the display area.

18. The computing device according to claim 2, wherein, the interface means comprise an actuation surface and a piezoelectric rod, filament or film extending between the actuation surface and the detection means, the piezoelectric rod, filament or film is configured to generate a voltage in response to user actuation via the actuation surface, and the detection means comprise a voltage sensor configured to detect the voltage generated by the piezoelectric rod, filament or film.

19. The computing device according to claim 2, wherein, the interface means comprises an actuation surface and a piezoelectric rod extending between the actuation surface and the detection means, the piezoelectric rod is configured to generate a surface acoustic wave in response to user actuation via the actuation surface, and the detection means comprise electric detector configured to detect the generated surface acoustic wave.

20. The computing device according to claim 2, wherein, the interface means comprise a compression surface and a container radiating alpha radiation and extending between the compression surface and the detection means, the container is configured to generate change in intensity of alpha radiation in response to compression via the compression surface, and the detection means comprise a radiation sensor configured to detect the change in the intensity of the alpha radiation of the container.

21. The computing device according to claim 2, wherein, the interface means comprise a sonic transmitter and a user accessible switch for generating a change to a transmission of the sonic transmitter, and the detection means comprise a sonic receiver configured to detect the change in the transmission of the sonic transmitter.

22. The computing device according to claim 2, wherein, the interface means comprise an actuator accessible to a user and a rod extending between the actuator and the detection means, the rod is configured to move in response to a movement of the actuator, and the detection means comprise a sensor configured to detect a movement of the rod.

23. The computing device according to claim 2, wherein, the interface means comprise a compression surface and a container comprising pressure transmitting material, the container extends between the compression surface and the detection means and is configured to generate change in pressure in response to compression via the compression surface, and the detection means comprise a pressure sensor configured to detect the pressure within the volume.

24. The computing device according to claim 2, wherein, the interface means comprise a magnetic actuator operable to a user, the actuator is configured to output a magnetic field that changes in response to a movement of the actuator, and the detection means comprise a sensor configured to detect the magnetic field of the actuator and output a signal that corresponds to the change in the magnetic field to the controller.

25. The computing device according to claim 1, wherein, the device is a wearable user terminal, and the distance from a straight line connecting any part of the interface means with any part of the detection means to the antenna is at some point less than 4 mm.

* * * * *